United States Patent [19]
Sakai

[11] Patent Number: 5,867,294
[45] Date of Patent: Feb. 2, 1999

[54] OPTICAL SPACE COMMUNICATION APPARATUS

[75] Inventor: Mikio Sakai, Kawasaki, Japan

[73] Assignee: Canon Kabushiki Kaisha, Tokyo, Japan

[21] Appl. No.: 997,589

[22] Filed: Dec. 23, 1997

Related U.S. Application Data

[63] Continuation of Ser. No. 309,687, Sep. 21, 1994, abandoned.

[30] Foreign Application Priority Data

| Sep. 24, 1993 | [JP] | Japan | 5-261573 |
| Jun. 28, 1994 | [JP] | Japan | 6-169017 |

[51] Int. Cl.$^6$ ................................................ H04B 10/00
[52] U.S. Cl. ................................. 359/172; 359/159
[58] Field of Search ................................ 359/172, 152, 359/154, 159

[56] References Cited

U.S. PATENT DOCUMENTS

| 3,590,681 | 7/1971 | Cross | 84/464 |
| 3,896,319 | 7/1975 | Chari | 310/14 |
| 4,498,023 | 2/1985 | Stout | 310/14 |
| 4,906,061 | 3/1990 | Yamaguchi | 350/6.3 |
| 4,954,905 | 9/1990 | Wakabashi et al. | 360/77.03 |
| 5,018,808 | 5/1991 | Meyers et al. | 350/6.91 |
| 5,065,455 | 11/1991 | Ito et al. | 359/1.59 |
| 5,122,644 | 6/1992 | Hasegawa et al. | 235/462 |
| 5,142,400 | 8/1992 | Solinsky | 359/159 |
| 5,206,555 | 4/1993 | Morris et al. | 310/105 |
| 5,247,165 | 9/1993 | Hiruta et al. | 350/201.3 |
| 5,247,167 | 9/1993 | Bargerhuff et al. | 250/208.1 |
| 5,329,395 | 7/1994 | Endo et al. | 359/159 |
| 5,347,387 | 9/1994 | Rice | 359/152 |
| 5,390,040 | 2/1995 | Mayeux | 359/152 |
| 5,434,722 | 7/1995 | Bizjak et al. | 360/69 |
| 5,594,580 | 1/1997 | Sakanaka et al. | 359/172 |
| 5,684,614 | 11/1997 | Degura | 359/172 |
| 5,689,354 | 11/1997 | Orino | 359/172 |

*Primary Examiner*—Leo H. Boudreau
*Assistant Examiner*—Bhavesh Mehta
*Attorney, Agent, or Firm*—Fitzpatrick, Cella, Harper & Scinto

[57] ABSTRACT

An optical space communication apparatus includes a transmission device for transmitting a first optical beam, a receiving device for receiving a second optical beam, a deflecting device for deflecting the first and second optical beams, which is arranged as rockable about at least two axes, and voice coil motors for driving the deflecting device.

7 Claims, 16 Drawing Sheets

OPTICAL SPACE COMMUNICATION APPARATUS

This application is a continuation under 37 C.F.R. § 1.53(b) of U.S. patent application Ser. No. 08/309,687, filed Sep. 21, 1994 now abandoned, whose contents are incorporated herein by reference.

BACKGROUND OF THE INVENTION

1. Field of the Invention

The present invention relates to an optical space communication apparatus for performing communication by propagating an optical beam in a free space.

2. Related Background Art

FIG. 1 is a drawing to show the structure of a conventional optical space communication apparatus which can correct an offset of alignment of an optical axis for communication, in which there are lenses 1, 2 and a movable mirror 3 provided on an optical path for communication with a mate apparatus and there are a polarization beam splitter 4, a partial reflection mirror 5, a lens 6, and a light-receiving element 7 successively arranged on the reflection side of the movable mirror 3. The movable mirror 3 is engaged with a gimbal mechanism 8 so as to be rotatable as shown in the partial structural drawings of FIGS. 2A and 2B, and the gimbal mechanism 8 is engaged with a fixed member 9, such as a main body of a lens barrel, so as to be rotatable, whereby the movable mirror 3 can be rotated about orthogonal pitch axis and yaw axis.

Also, a light-emitting element 11 is provided through a lens 10 on the reflection side of the polarization beam splitter 4, and a position detector 13 such as a CCD or a segmental device is provided through a lens 12 on the reflection side of the partial reflection mirror 5. Further, an output of the position detector 13 is connected through a signal processing circuit 14 with a drive circuit 15, and an output of the drive circuit 15 is connected with an actuator 16 for driving to rotate the movable mirror 3 about the X-axis and with an actuator 17 for driving to rotate the gimbal mechanism 8 about the Y-axis.

For transmission in optical space communication, an optical beam emitted from the light-emitting element 11 is reflected by the movable mirror 3, while for reception an optical beam from the mate apparatus is guided via the movable mirror 3 onto the light-receiving element 7.

FIG. 3 shows a state in which an apparatus A happens to change its posture about the pitch axis because of an external factor such as vibration, impact, etc. For this reason, since a transmission beam from the apparatus A deviates, an apparatus B becomes incapable of receiving the beam signal.

In FIG. 4 which shows details of the apparatus A shown in FIG. 3, an optical path of a receiving beam Lr from the polarization beam splitter 4 to the light-receiving element 7 and the position detector 13 in a state in which the apparatus A does not happen to change its posture is depicted by dashed lines. As shown in FIG. 4, in the apparatus A the posture of which has been changed, the light spots respectively on the light-receiving element 7 and the position detector 13 move as depicted by solid lines. When the movement of the light spot is large such that the light spot goes beyond the light-receiving surface, the apparatus A becomes incapable of receiving signals.

In this case, a distance of movement of a light spot is first detected by the position detector 13, as shown in FIG. 4, and the change in posture of the apparatus is calculated in the signal processing circuit 14. Then the drive circuit 15 drives the actuator 16, based on the information, to rotate the movable mirror 3 in the direction of arrow J as shown in FIG. 5. By this, the position of the spot on the light-receiving element 7 can be kept at an initial position where the spot was located before the posture change, so that the transmission beam Lt can be directed toward the apparatus B, enabling to perform transmission and reception in communication with the apparatus B, as shown in FIG. 6.

In case of a change in posture about the yaw axis, the actuator 17 is driven to rotate the movable mirror 3 about the yaw axis, thus correcting an alignment offset.

In the conventional apparatus, dc motors or stepping motors are used as the actuators 16, 17.

The conventional apparatus, however, had the following problems. If the dc motors were used in the above-described conventional example, because the dc motors can supply only a small torque as compared with its large occupying volume, dissipation power would be increased and frequency response would be degraded. Further, an increased scale of the motors would result in increasing the size of the entire apparatus, increasing the weight, etc. In case of the stepping motors being employed, a problem is that alignment age accuracy is degraded because of the limit of angular resolution.

In addition, a problem of a drop in performance and reliability will arise because of abrasion of brushes in either case of the dc motors or the stepping motors.

Further, a drive force is transmitted to the mirror or the gimbal member through a rocking shaft supporting the mirror or the gimbal member in the conventional example. In that case, the diameter of the shaft is set relatively large in order to reinforce the rocking shaft and to realize joint structure with a motor shaft, resulting in necessitating a large bearing. This increases the frictional resistance, which degrades frequency characteristics.

SUMMARY OF THE INVENTION

It is an object of the present invention to provide an optical space communication apparatus which is compact in size, high in resolution, and free of degradation of performance and reliability after use for a long period.

An optical space communication apparatus according to the present invention, achieving the above object, is an optical space communication apparatus for performing optical space communication while correcting alignment of an optical axis for communication with a mate communication apparatus, which comprises an optical element rockable about at least two axes and voice coil motors each comprising a coil and a magnetic circuit for giving a magnetic field to the coil, rocking at least one of the coil and the magnetic circuit about the same axis as the optical element, wherein the optical element is driven by the voice coil motors.

The optical space communication apparatus according to the present invention, having the above-described structure, corrects an offset of alignment of the communication axis by driving the optical element by means of the voice coil motors each comprising a coil and magnetic circuit, rocking about the same axis as the optical member.

DETAILED DESCRIPTION OF THE PREFERRED EMBODIMENTS

The present invention will be described in detail based on the embodiments shown in FIG. 7 to FIG. 18.

Figure 1:
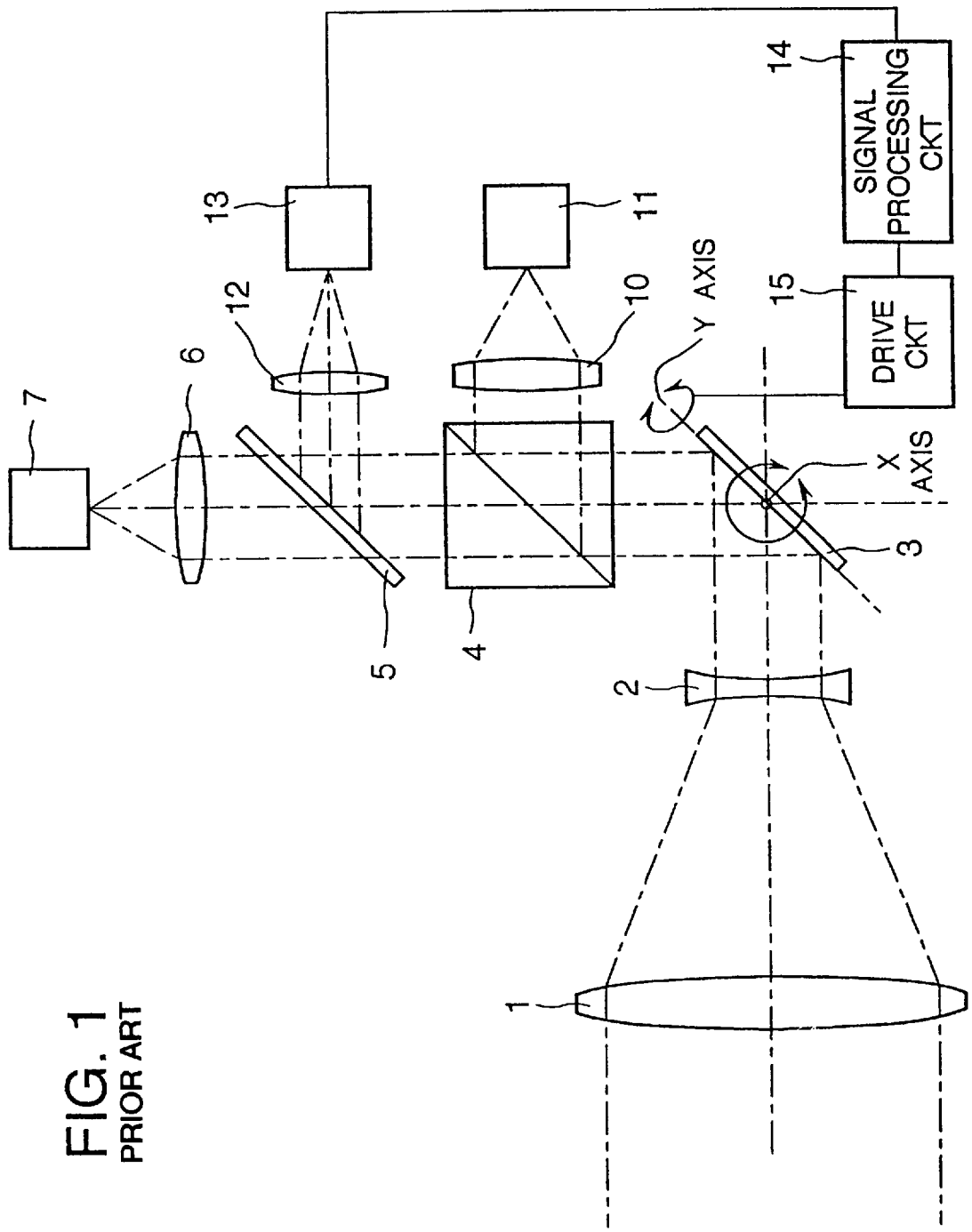
FIG. 1 is a drawing to show the structure of a conventional optical space communication apparatus.
Figure 2A:
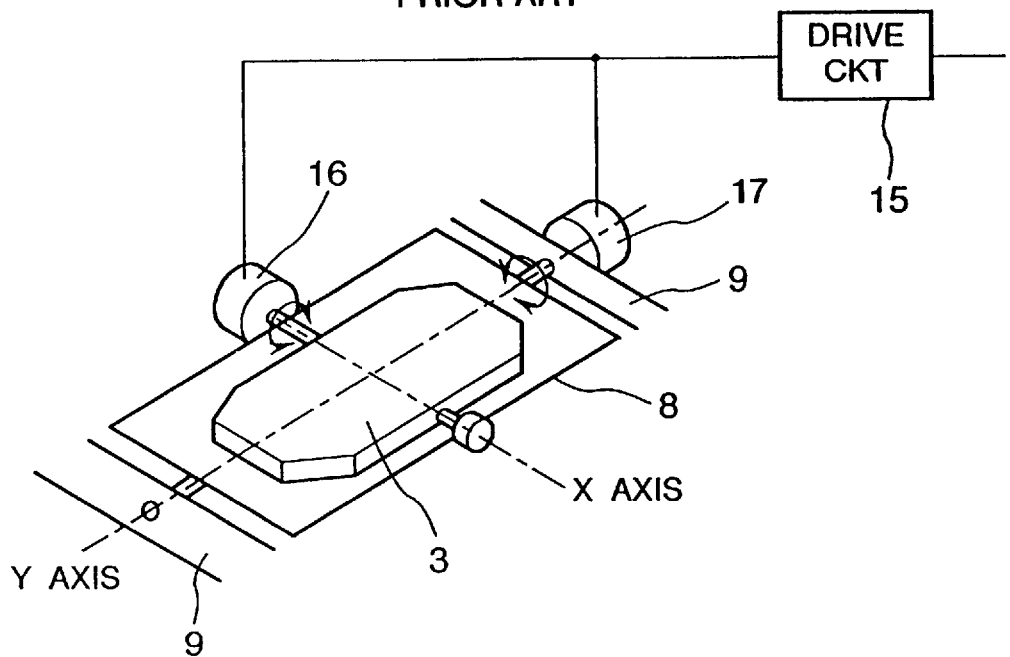
FIG. 2A is a perspective view of a mirror driving portion in the conventional optical space communication apparatus.
Figure 2B:
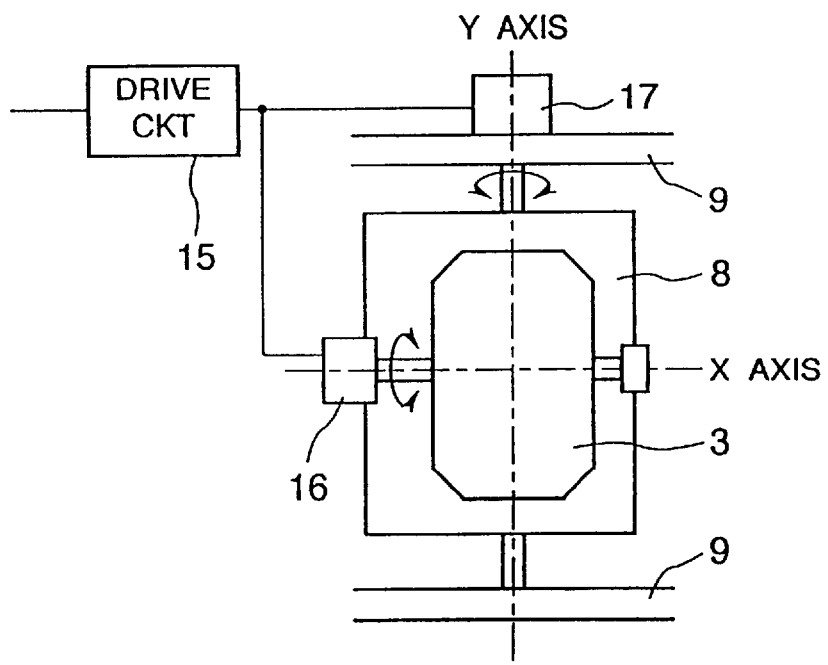
FIG. 2B is a plan view of the mirror driving portion.
Figure 3:
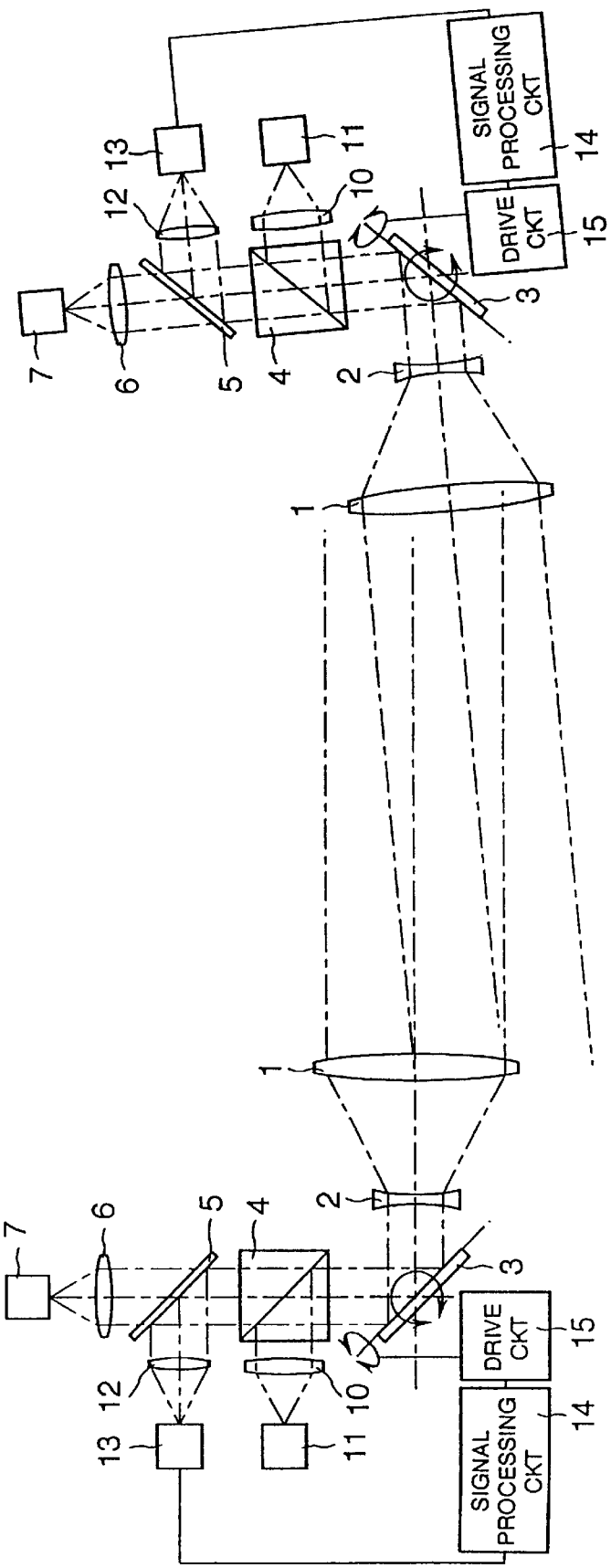
FIG. 3 is an explanatory drawing of the optical space communication apparatus changed in posture.
Figure 4:
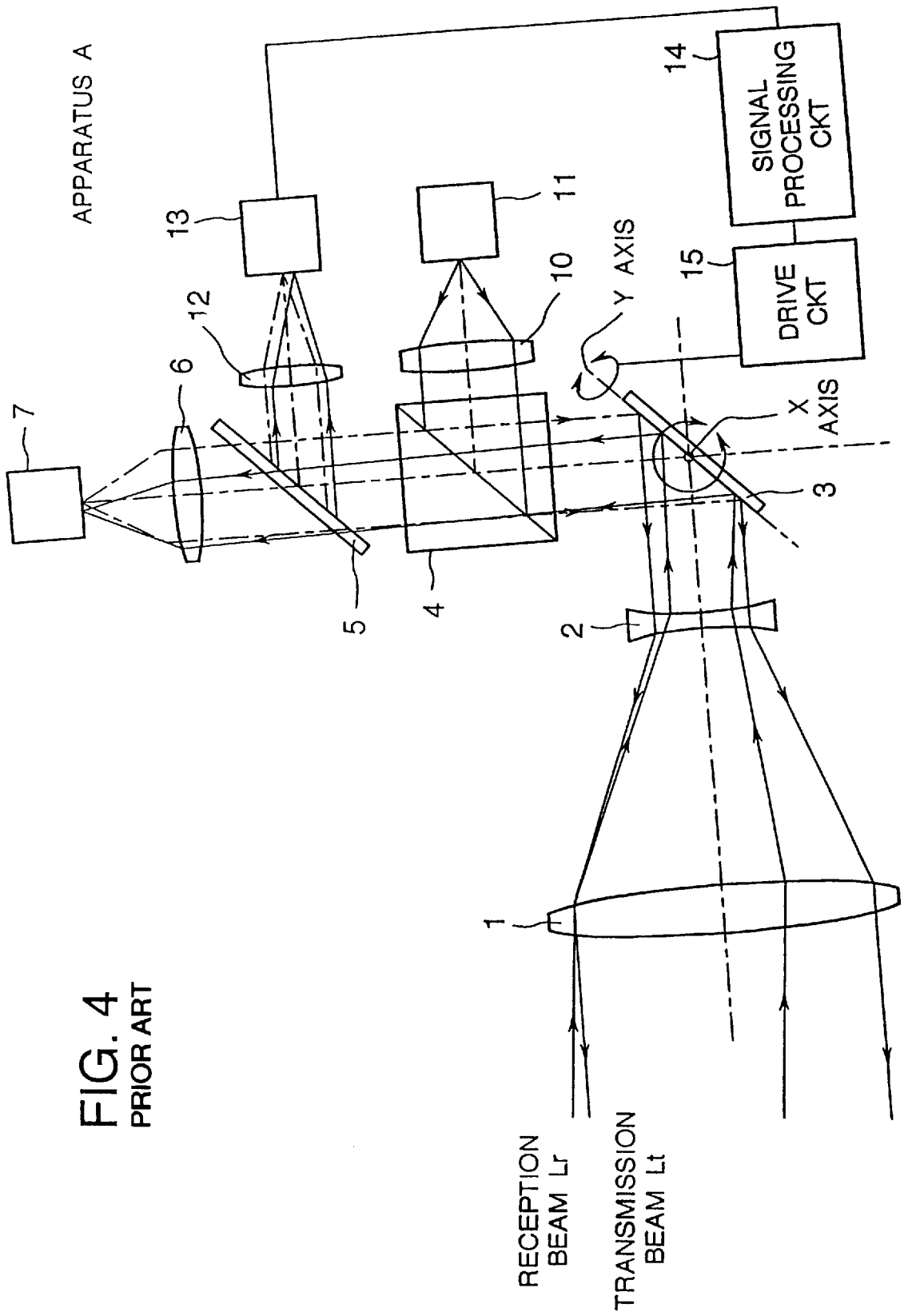
FIG. 4 is an explanatory drawing of the optical space communication apparatus changed in posture.
Figure 5:
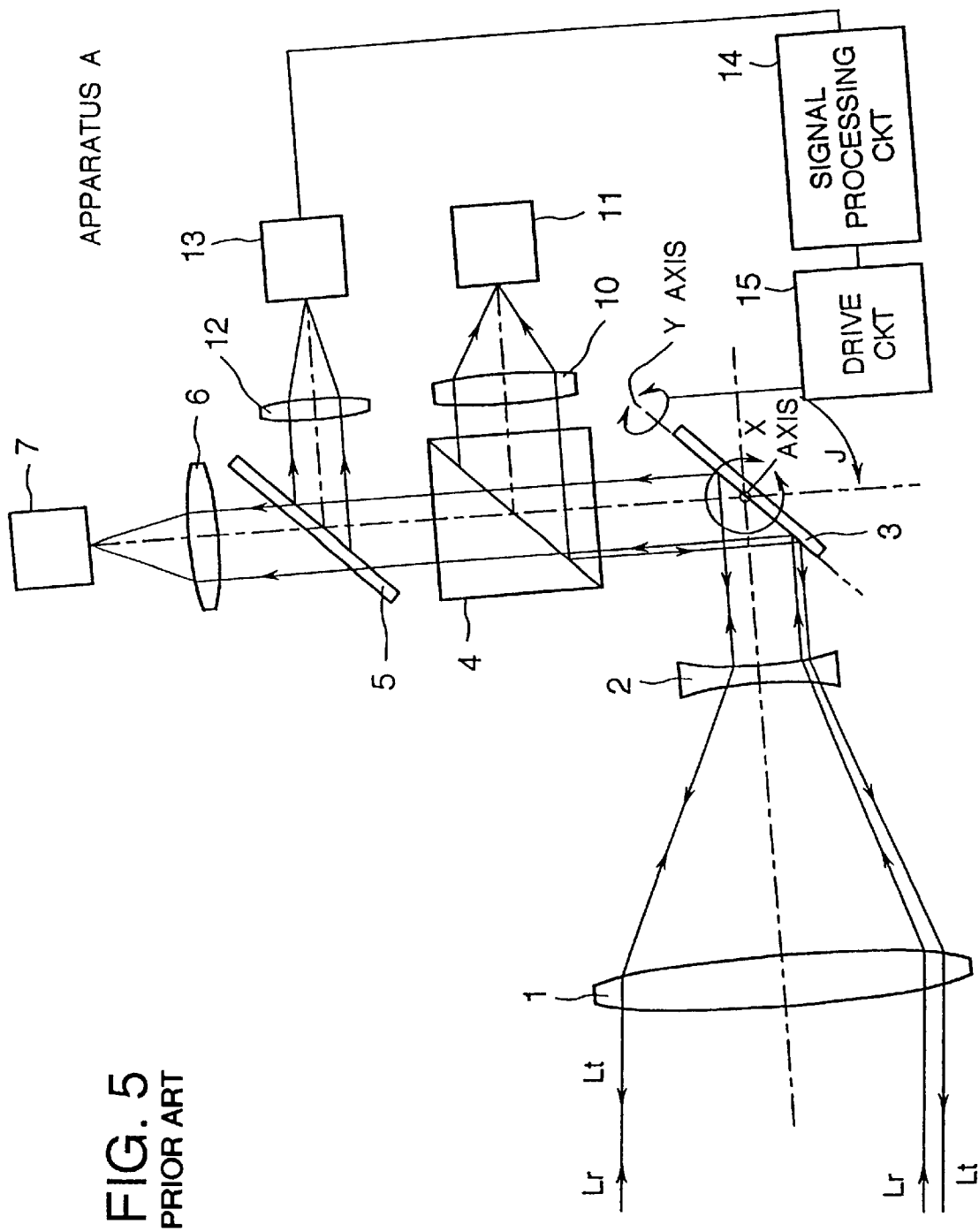
FIG. 5 is an explanatory drawing to show a state after correction of an alignment offset of the communication axis.
Figure 6:
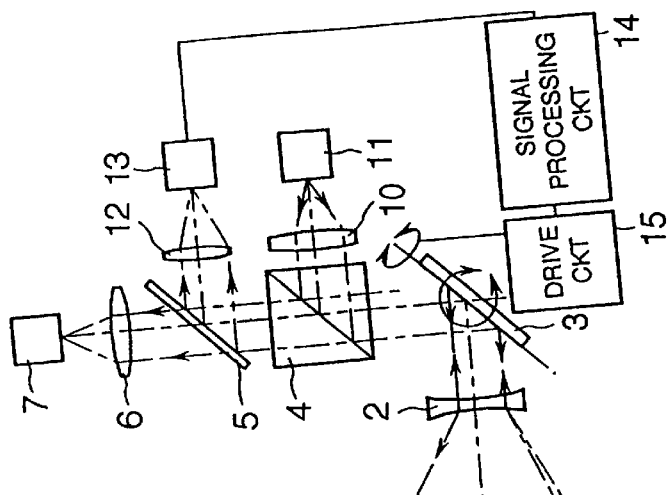
FIG. 6 is an explanatory drawing to show a state after correction of the alignment offset of the communication axis.
Figure 6:
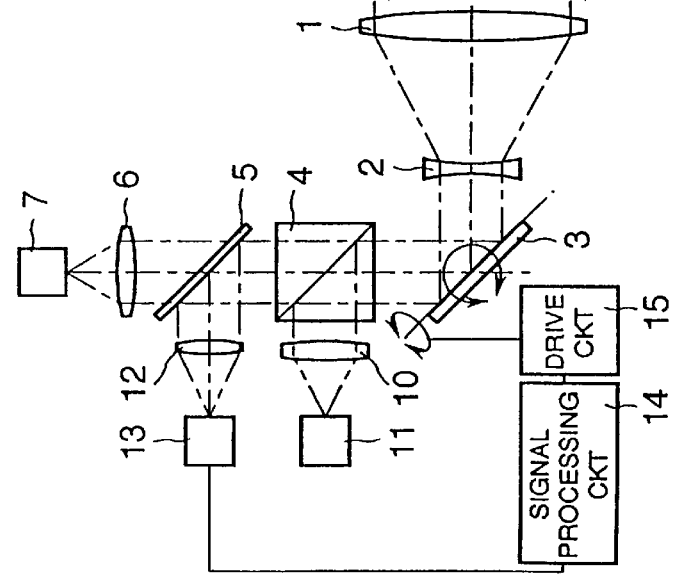
Figure 7:
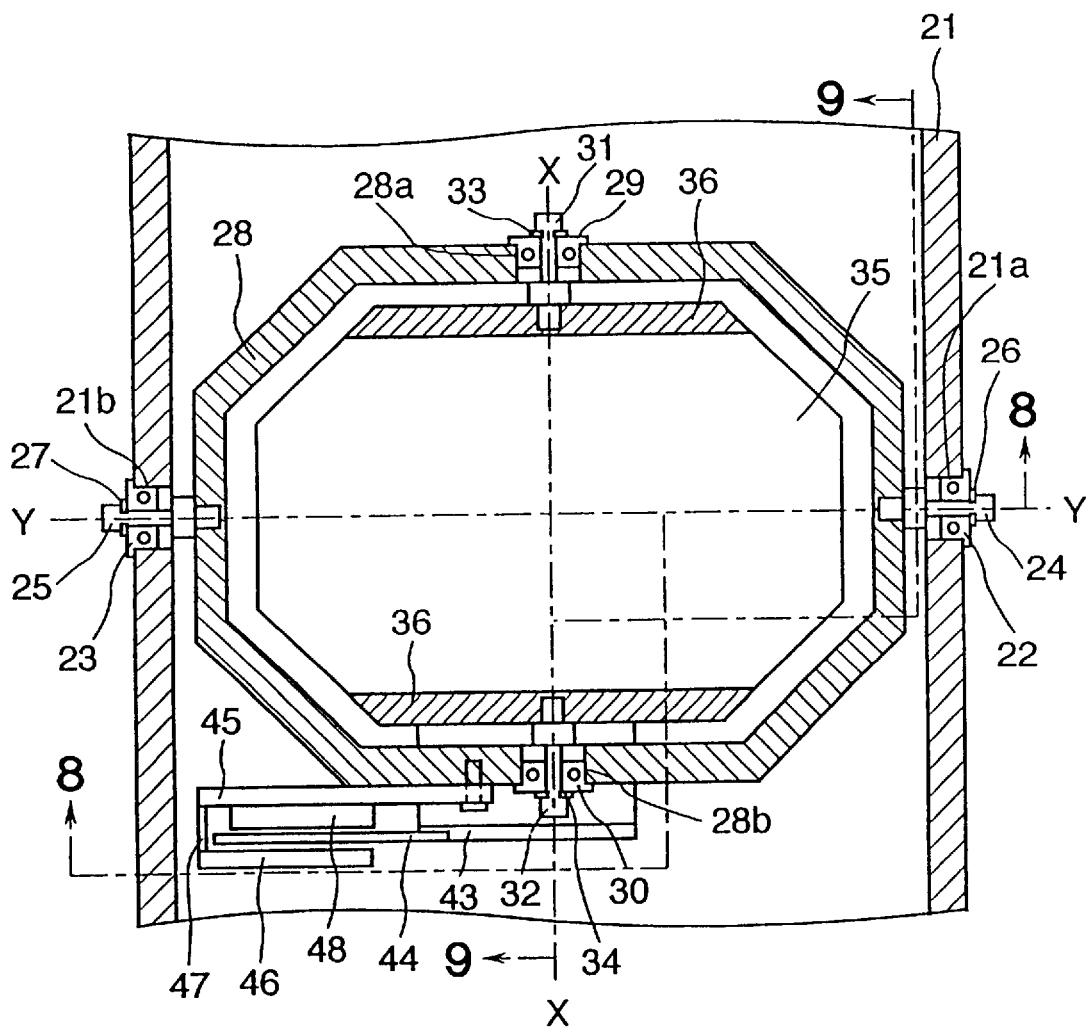
FIG. 7 is a drawing to show the structure of the first embodiment of the optical space communication apparatus according to the present invention.
Figure 8:
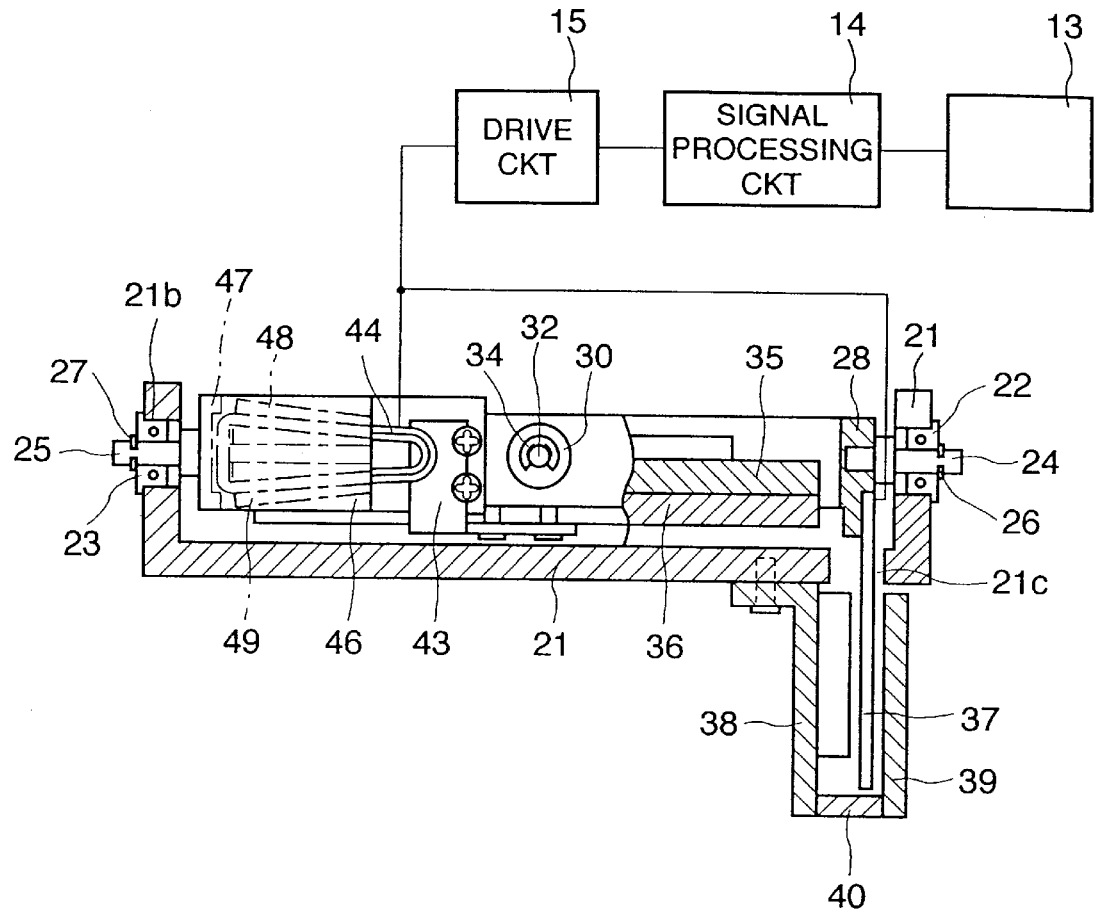
FIG. 8 is a cross section along 8—8 line in FIG. 7.
Figure 9:
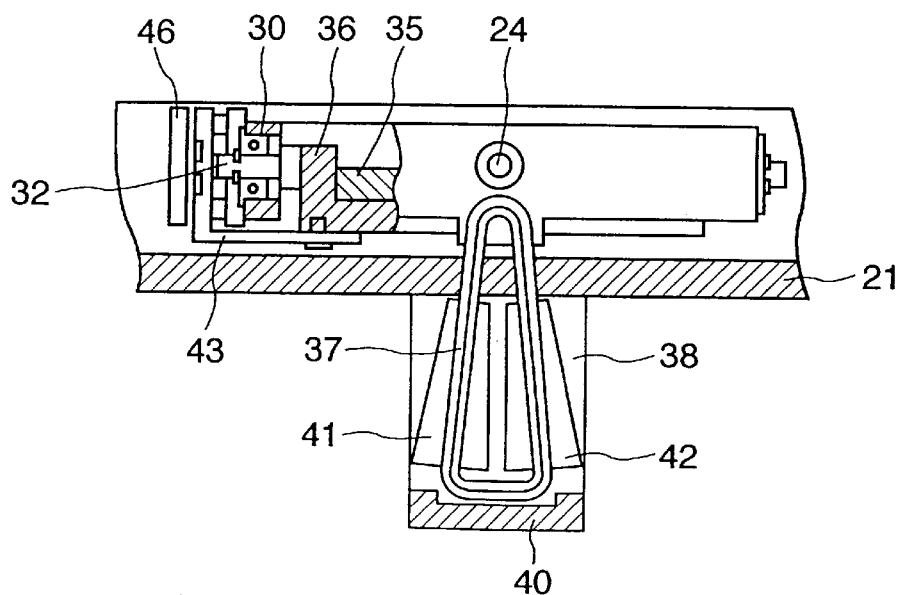
FIG. 9 is a cross section along 9—9 line in FIG. 7.

In the first embodiment an optical arrangement of the optical space communication apparatus is the same as that as described with FIG. 1, and, therefore, only the structure of the movable mirror is described herein. FIG. 7 is a drawing to show the structure of the movable mirror 3, FIG. 8 is a cross section along 8—8 line in FIG. 7, and FIG. 9 is a cross section along 9—9 line in FIG. 7. Bearings 22, 23 are fit as opposed to each other in fitting holes 21a, 21b formed on the both sides of a fixed member 21 provided in the main body of the apparatus, and shafts 24, 25 are engaged with the bearings 22, 23 so as to be rotatable. The shafts 24, 25 are fixed so as not to move along the axial direction, by washers 26, 27, respectively.

A gimbal mechanism 28 is set on the shafts 24, 25 so as to be rockable about the Y-axis, and bearings 29, 30 are fit in fitting holes 28a, 28b formed in the gimbal mechanism 28 so as to be opposed to each other and perpendicular to the bearings 22, 23. Shafts 31, 32 are engaged with the bearings 29, 30 so as to be rotatable therein, and the shafts 31, 32 are fixed so as not to move along the axial direction, by washers 33, 34, respectively. Further, a mirror holding member 36 for holding a mirror 35 is set on the shafts 31, 32 so as to be rockable about the X-axis.

Also, one end of a suspended coil 37 is fixed to the gimbal mechanism 28 while the other end of the coil 37 is arranged to project outwardly through a hole 21c formed in the fixed member 21. The coil 37 is kept at clearances to magnetic members 38, 39 fixed on the fixed member 21, by a spacer 40 of a non-magnetic body provided between the magnetic members 38 and 39. Two magnets 41 and 42 are fixed on the inner surface of the magnetic member 38 to generate a magnetic field toward the coil 37.

Further, one end of a coil 44 horizontally arranged is buried in a connecting member 43 fixed to the mirror holding member 36, and the coil 44 is kept at clearances to magnetic members 45, 46 fixed to the gimbal mechanism 28, by a spacer 47 of a non-magnetic body provided between the magnetic members 45 and 46. Two magnets 48, 49 are fixed to the magnetic member 45 to generate a magnetic field toward the coil 44. An output of the drive circuit 15 is connected with the coils 37, 44 to apply a voltage thereto.

Figure 10:
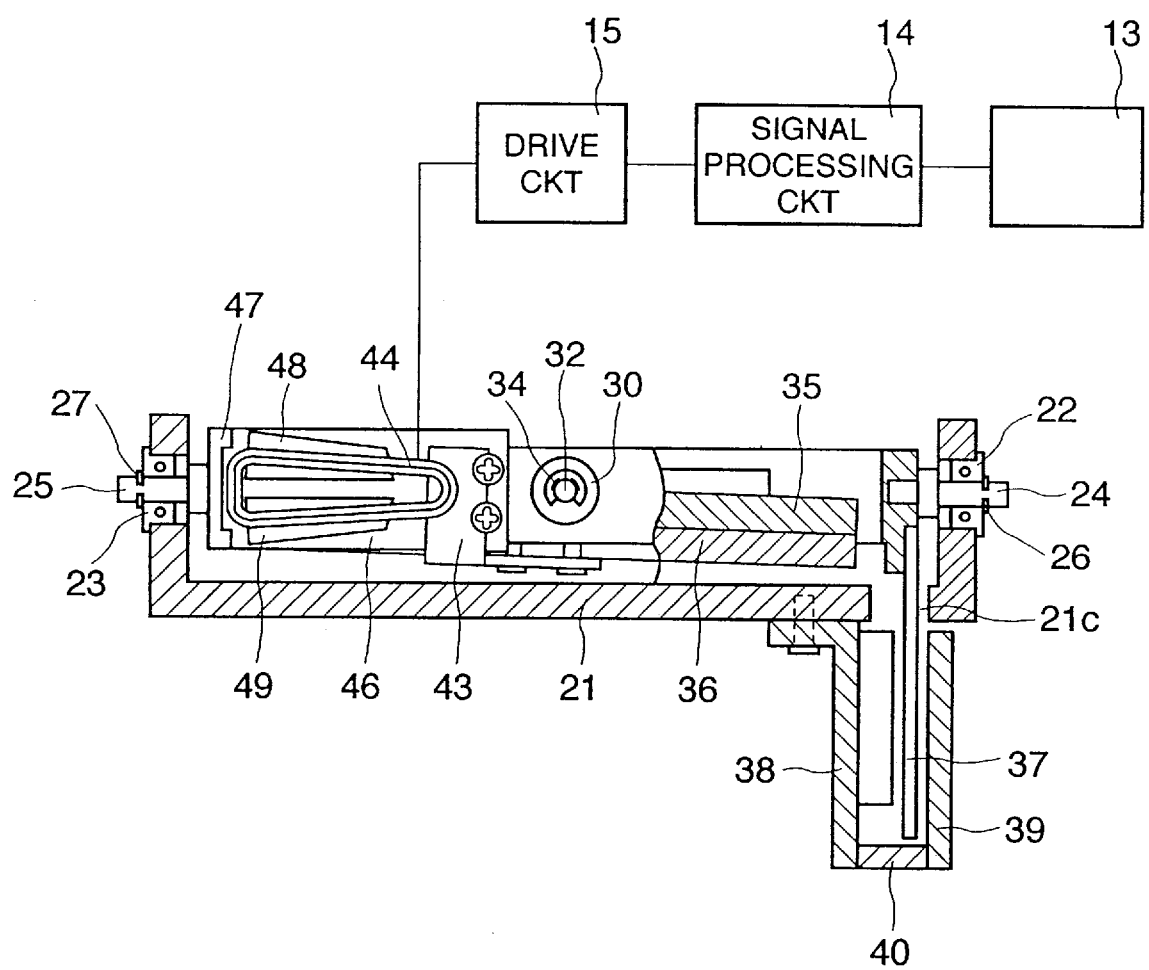
FIG. 10 is an explanatory drawing to show a case of a change in posture about the X-axis.

When the position detector 13, such as the CCD or the segmental device as described with FIG. 1, detects a posture change, the signal processing circuit 14 calculates an amount of the posture change. First, in case of a posture change about the X-axis as the pitch axis, the drive circuit 15 applies the voltage to the coil 44, based on an amount of the posture change, as shown in FIG. 10. The application of voltage rocks the coil 44 under an action of the magnets 48, 49 to produce a torque about the X-axis. This torque drives the mirror holding member 36 and mirror 35 about the X-axis through the connecting member 43 to correct an alignment offset about the X-axis.

Figure 11:
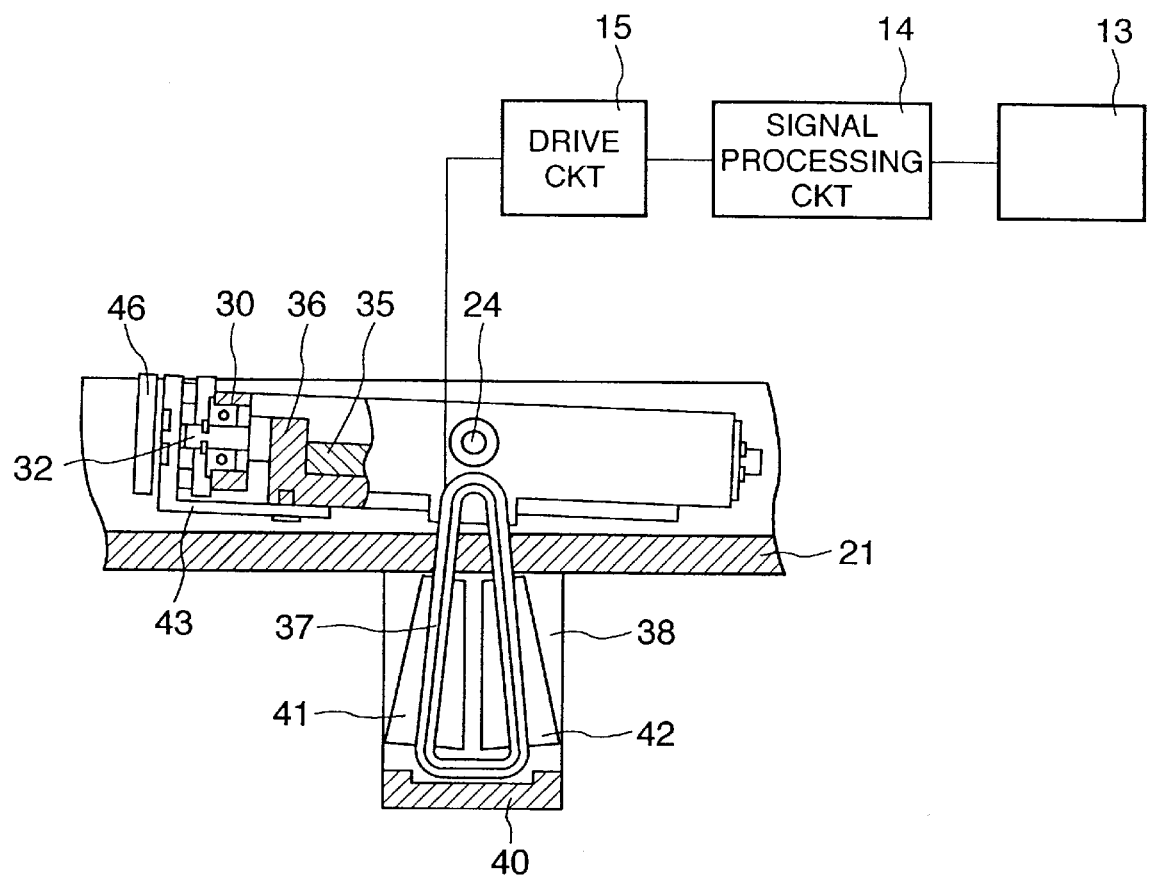
FIG. 11 is an explanatory drawing to show a case of a change in posture about the Y-axis.

In case a posture change about the Y-axis as the yaw axis, the drive circuit 15 applies the voltage to the coil 37, based on an amount of the posture change, as shown in FIG. 11. This application of voltage rocks the coil 37 under an action of the magnets 41, 42 to generate a torque about the Y-axis. This torque drives the gimbal mechanism 28 about the Y-axis, with which the mirror 35 also rotates about the Y-axis to correct an alignment offset.

Since an inertial moment about the X-axis is smaller than that about the Y-axis, the coil 44 and the magnetic circuit composed of the magnetic member 45, the magnets 48, 49, etc. for driving the optical element about the X-axis are constructed in smaller scale than the coil 37 and the magnetic circuit composed of the magnetic member 38, the magnets 41, 42, etc. for driving the optical element about the Y-axis. Thus, the size of the coil and magnetic circuit constituting a voice coil motor for one axis about which the optical element rocks differs from that for the other axis about which the optical element rocks.

It is of course the case that the same effect can be attained by such an arrangement that the positional relation between the coil and the magnetic circuit is exchanged so as to apply the voltage to the fixed coil and to rock the magnetic circuit.

Driving the mirror 35 by the voice coil motors rocking about the two axes, as described above, the alignment offset of the communication axis can be well corrected with low dissipation power, with high resolution, and with excellent frequency response, the drop in performance and reliability due to the abrasion of brushes can be prevented, and the mirror drive portion can be constructed in a smaller size.

As described above, the optical space communication apparatus of the present invention is an optical space communication apparatus for performing optical space communication while correcting the alignment of the communication axis with a mate communication apparatus, which comprises an optical element arranged as rockable about at least two axes, and voice coil motors each comprising a coil and a magnetic circuit for applying a magnetic field to the coil, rocking at least one of the coil and the magnetic circuit about the same axis as the optical elements, wherein the voice coil motors drive the optical element.

The above voice coil motors are not arranged in such a manner that a drive force is put through the rocking shaft of the above optical element, but in such a manner that the drive force is put directly through the optical element, through the holding member of the optical element, or through the gimbal member supporting the holding member as rockable about the at least two axes.

Also, the size of the coil and the magnetic circuit for one axis is different from that for the other axis.

The optical space communication apparatus of the present invention as described with reference to FIG. 7 to FIG. 11 is so arranged that the gimbal mechanism 28 is engaged with the fixed member 21 on the apparatus main body so as to be rockable about the Y-axis, and that the mirror holding member 36 holding the mirror 35 is engaged with the gimbal mechanism 28 so as to be rockable about the X-axis. The coil 44 is arranged on the mirror holding member 36 so as to be rockable about the X-axis through the connecting member 43, while the magnets 48, 49 fixed through the magnetic member 45 are provided on the gimbal mechanism 28. By this arrangement, the first voice coil motor is constructed for rocking the mirror holding member 36 about the X-axis. Also, the coil 37 rockable about the Y-axis is provided on the gimbal mechanism 28, while the magnets 41, 42 fixed through the magnetic member 38 are provided on the fixed member 21. By this, the second voice coil motor is constructed for rocking the gimbal mechanism 28 about the Y-axis. The alignment offset is corrected by rotating the mirror 35 about the two axes by means of the first and second voice coil motors.

Figure 12:
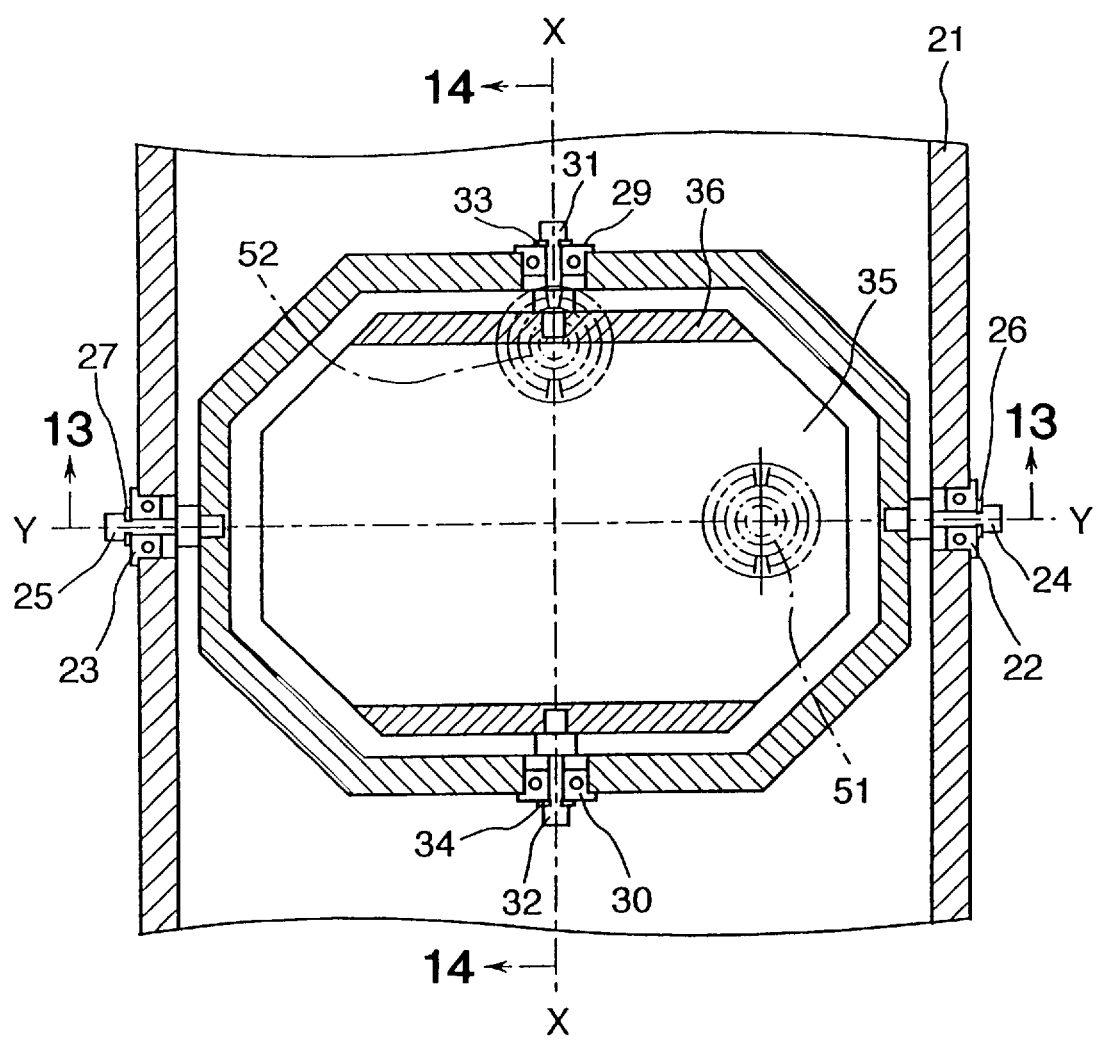
FIG. 12 is a drawing to show the structure of the second embodiment of the optical space communication apparatus according to the present invention.
Figure 13:
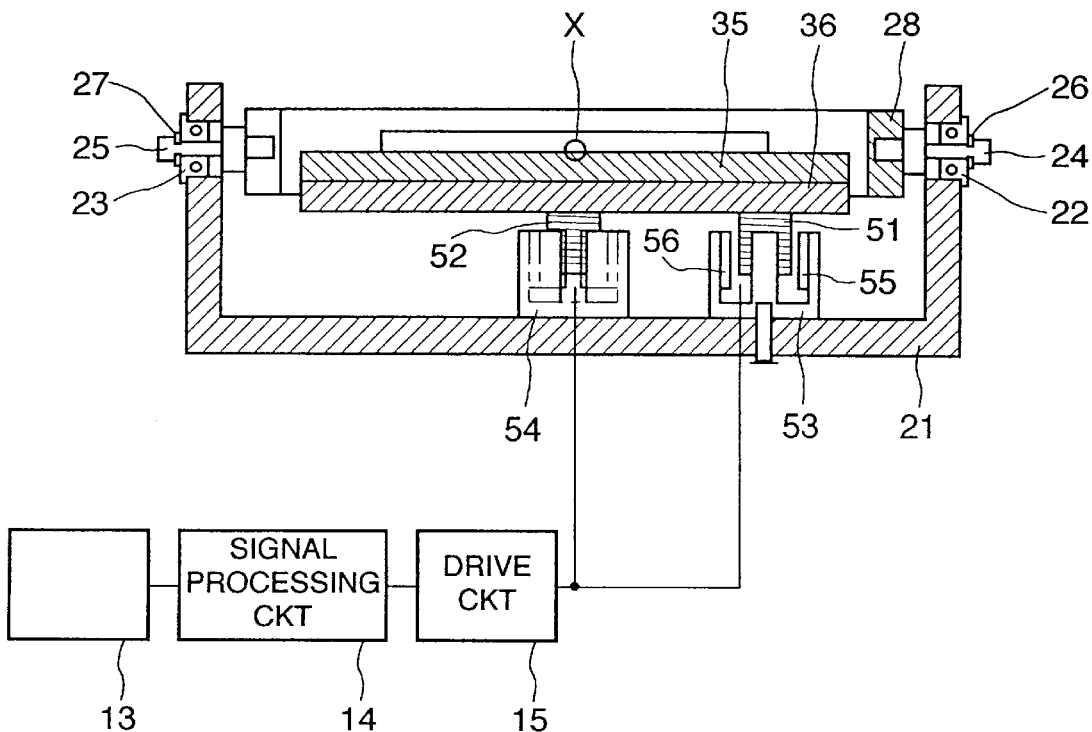
FIG. 13 is a cross section along 13—13 line in FIG. 12.
Figure 14:
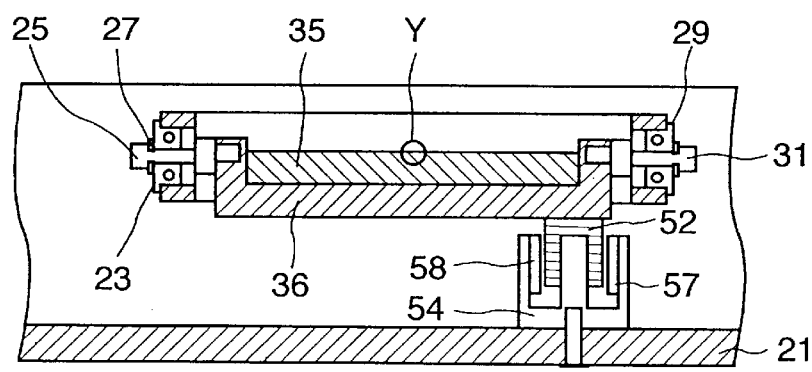
FIG. 14 is a cross section along 14—14 line in FIG. 12.

FIG. 12 is a drawing to show the structure of the second embodiment of the optical space communication apparatus. Since the overall structure of the apparatus is similar to that in FIG. 1, only the structure of the movable mirror is described herein. FIG. 13 is a cross section along 13—13 line in FIG. 12, and FIG. 14 a cross section along 14—14 line in FIG. 12. In the drawings, the same reference numerals designate the same members as those in the first embodiment. Two coils 51, 52 are connected at one end thereof to the bottom surface of the mirror holding member 36 while magnetic members 53, 54 fixed to the fixed member 21 surround the other end of each of the coils 51, 52, respectively. Two magnets 55, 56 are arranged in the magnetic member 53 so as to be opposed to each other with the coil 51 between, and two magnets 57, 58 are arranged in the magnetic member 54 so as to be opposed to each other with the coil 52 between. An output of the drive circuit 15 is connected with the coils 51, 52.

Figure 15:
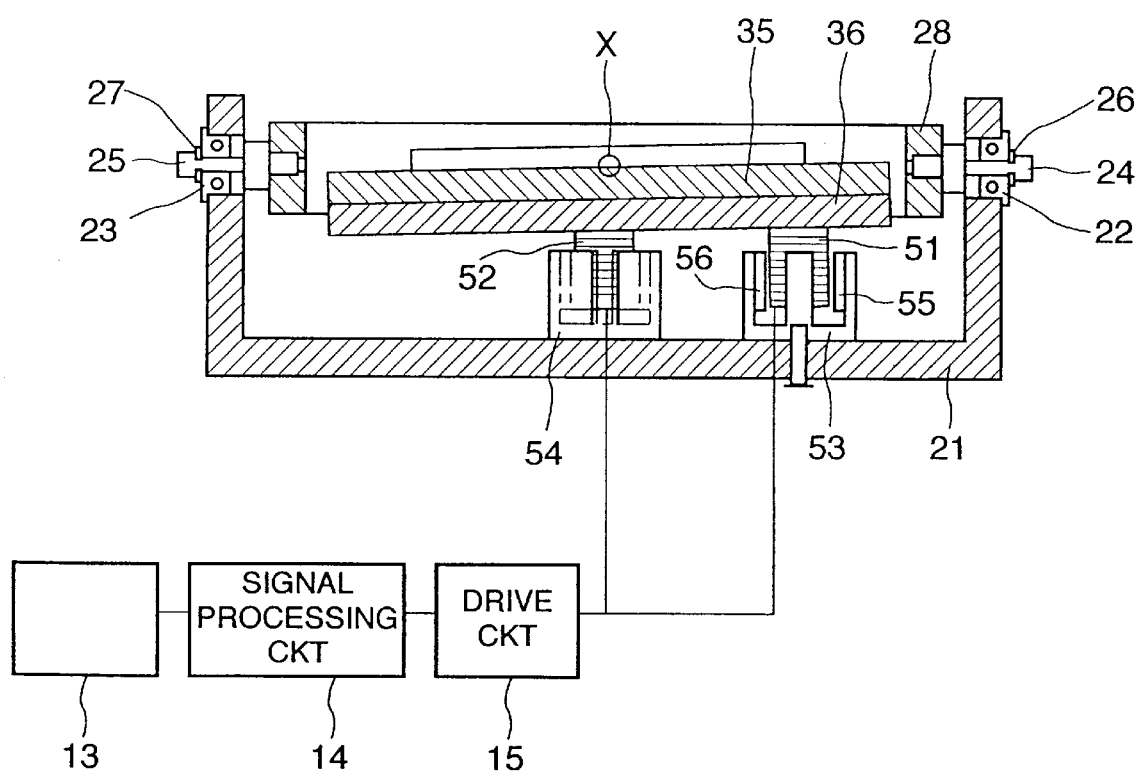
FIG. 15 is an explanatory drawing to show a change in posture about the X-axis.

Similarly as in the first embodiment, when the position detector 13, such as the CCD or the segmental device as described with FIG. 1, detects a posture change, the signal processing circuit 14 calculates an amount of the posture change. In case of the posture change about the X-axis, the drive circuit 15 applies a voltage to the coil 51, based on the amount of the posture change, as shown in FIG. 15. The application of voltage vertically rocks the coil 51 under an action of the magnets 55, 56 to produce a torque about the X-axis so as to rotate the mirror holding member 36 about the X-axis. With the rotation of the mirror holding member 36, the mirror 35 also rotates about the X-axis, thus correcting the alignment offset.

Figure 16:
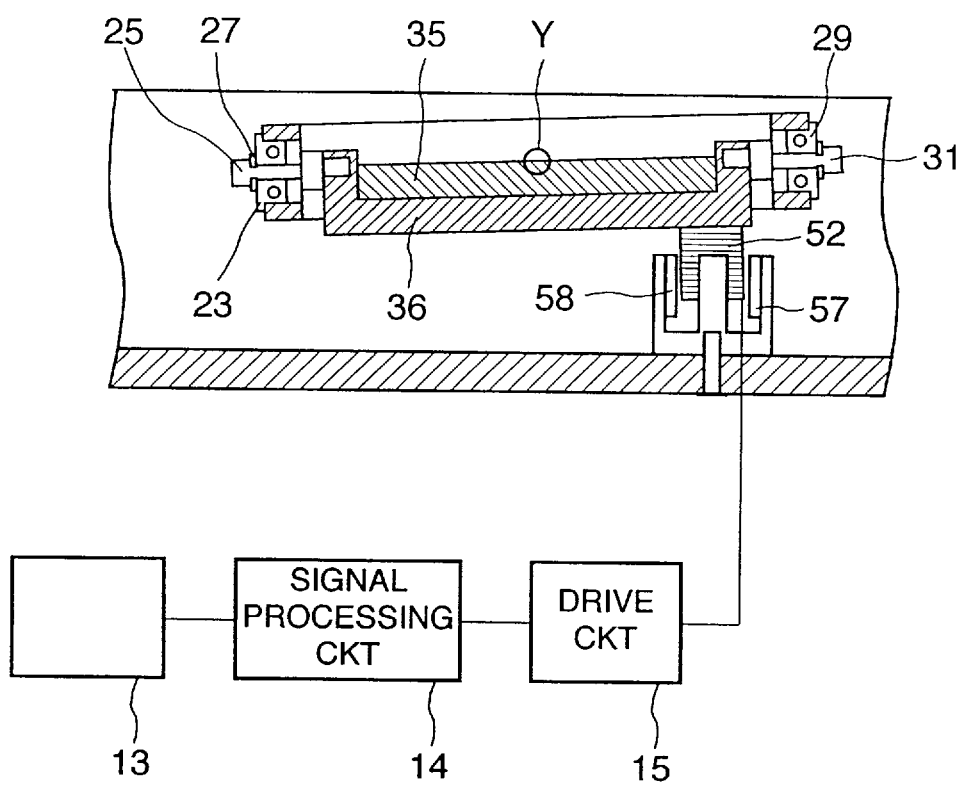
FIG. 16 is an explanatory drawing to show a change in posture about the Y-axis.

Also, in case of the posture change about the Y-axis, the drive circuit 15 applies the voltage to the coil 52, as shown in FIG. 16, to vertically rock the coil 52 under an action of the magnets 57, 58 so as to rotate the mirror holding member 36 about the Y-axis. With the rotation of the mirror holding member 36, the mirror 35 also rotates about the Y-axis, thus correcting the alignment offset about the Y-axis.

The above arrangement can also permit the alignment offset to be corrected with low dissipation power, with high resolution, and with excellent frequency response, as in the first embodiment.

Figure 17:
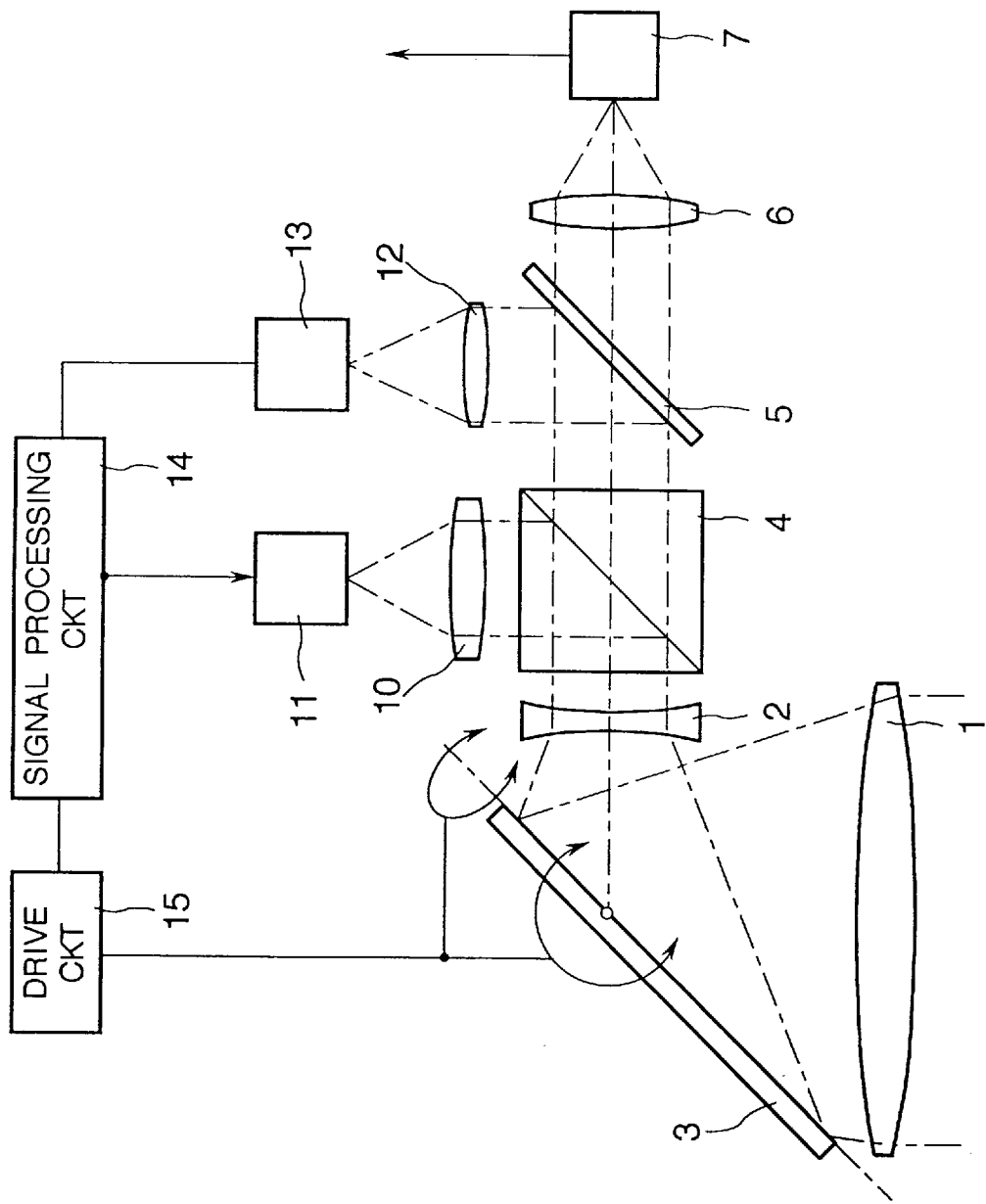
FIG. 17 is a drawing to show a modification.
Figure 18:
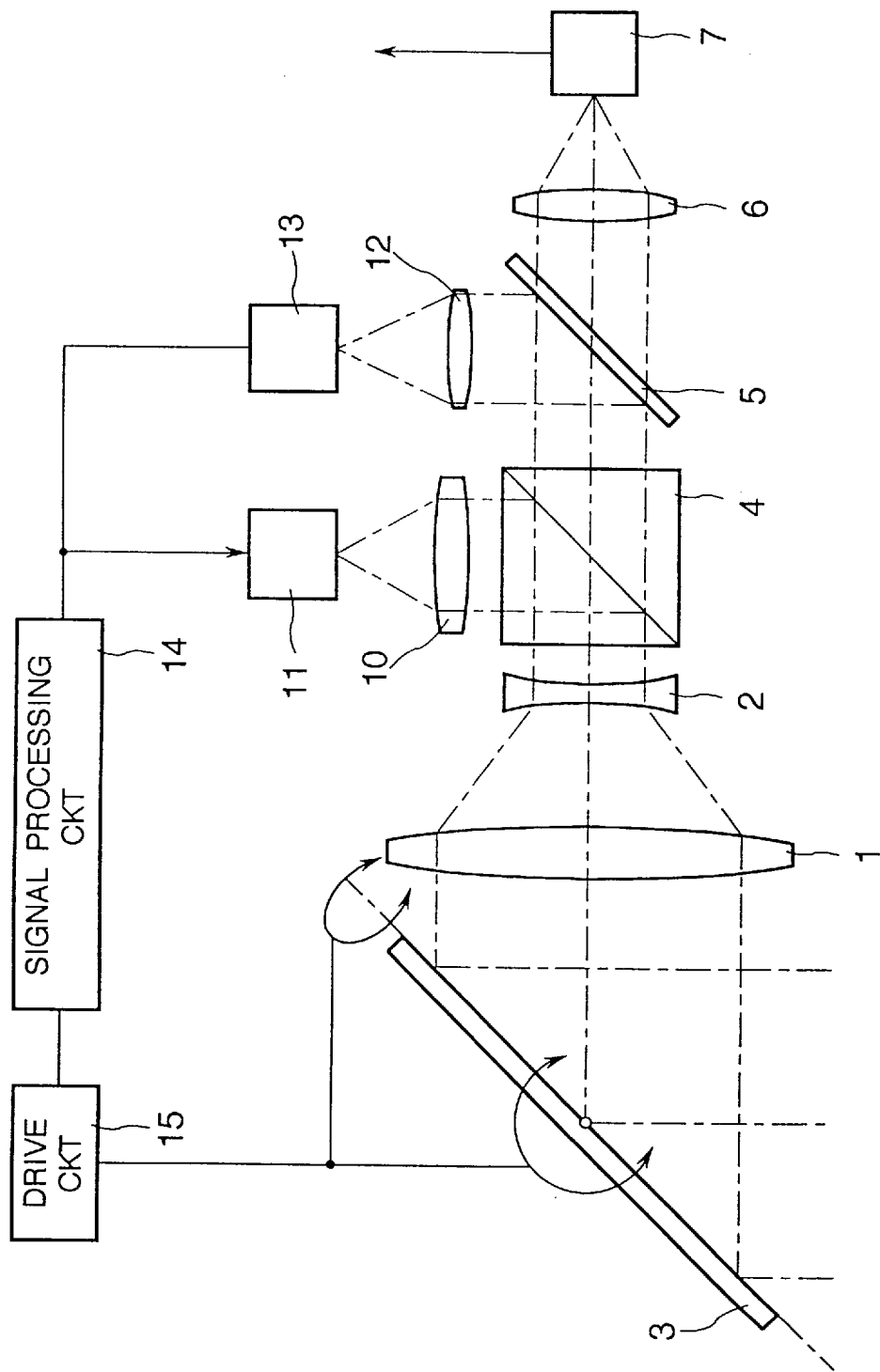
FIG. 18 is a drawing to show another modification.

Although the first and second embodiments were so arranged that the lenses 1, 2 were set before the movable mirror 3, as shown in FIG. 1, the same result as in the first and the second embodiments can be achieved by an arrangement of the third embodiment shown in FIG. 17 in which the lens 2 is located behind the movable mirror 3, or by an arrangement of the fourth embodiment shown in FIG. 18 in which the lenses 1, 2 both are located behind the movable mirror 3.

Especially, employing the arrangement of the fourth embodiment shown in FIG. 18, an angular change of the optical path by the movable mirror 3 will cause no disturbance of aberrations of the lenses 1, 2, which increases the range of alignment of the optical axis and greatly improves the reliability of the optical space communication apparatus.

In this case, the movable mirror 3, which is a single reflection mirror, needs to have an increased size, which also increases the size of the drive portion thereof. Therefore, this arrangement has not been preferred because it has been considered not practical. Employing the arrangement using the voice coil motors as in the present embodiment, the drive portion of the moving mirror 3 can be constructed in a compact size, thus obtaining an optical space communication apparatus which is highly practical and reliable.

In the fourth embodiment, the movable mirror 3 is located before the optical means (10, 4, 2, 1) for converting an optical beam emitted from the light-emitting element 11 into a beam of parallel rays. Namely, there is no condensing means such as a lens disposed on the optical path between the movable mirror 3 and the mate communication apparatus. Such an arrangement facilitates designing of the entire apparatus and permits the apparatus to be designed in a compact size, because the drive portion of the moving mirror 3 does not have to be set behind the lens 1.

Further, the above embodiments employed the pitch axis and the yaw axis as the two axes for the sake of description, but the intended region of the present invention is by no means limited to the pitch axis and the yaw axis.

As described above, the optical space communication apparatus according to the present invention are so arranged that the optical element is driven using the voice coil motors each composed of the coil and the magnetic circuit giving the magnetic field to the coil, rocking about a same axis as the optical element does, whereby the apparatus can correct the alignment offset of the communication axis with low dissipation of power, with excellent frequency response, and with high resolution, can prevent the degradation in performance and reliability due to the abrasion of brushes, can decrease the size and weight of the entire apparatus. Also, the apparatus can be set at an unstable place, whereby superior and reliable communication line can be secured at a low cost.

What is claimed is:

1. An optical space communication apparatus for performing communication with a party communication apparatus by propagating an optical beam in free space, said apparatus comprising:

transmitting means for transmitting a first optical beam to the party communication apparatus;

receiving means for receiving a second optical beam from the party communication apparatus;

deflecting means for correcting an alignment error of a communication optical axis by deflecting the first and second optical beams, said deflecting means being arranged to move back and forth about at least two axes;

at least two voice coil motors for driving said deflecting means said at least two voice coil motors comprising a magnetic circuit and a coil at least one of which is adapted to rock about the same axis as said deflecting means; and posture change detecting means for detecting posture change, said posture change detecting means applying a voltage to said coil based on an amount of the posture change.

2. The apparatus according to claim 1, wherein said deflecting means is a single reflection mirror.

3. The apparatus according to claim 1, wherein said at least one voice coil motor is arranged to apply a drive force into at least one of a holding member and a gimbal member of said deflecting means.

4. The apparatus according to claim 1, wherein the shape of each of said at least one voice coil motor differs for each axis about which said deflecting means moves back and forth.

5. The apparatus according to claim 1, wherein said at least one voice coil motor comprises a coil and a magnetic circuit, for which the configuration differs in each axis.

6. An optical space communication apparatus for performing communication with a party communication apparatus by propagating an optical beam in free space, said apparatus comprising:

light source means for emitting a first optical beam from said apparatus;

receiving means for receiving a second optical beam from the party communication apparatus;

optical means for converting said first optical beam into an optical beam of parallel rays;

deflecting means for correcting an alignment error of a communication optical axis by deflecting the optical beam of parallel rays, said deflecting means being arranged to move back and forth about at least two axes; and at least two voice coil motors for driving said deflecting means, said at least two voice coil motors comprising a magnetic circuit and a coil at least one of which is adapted to rock about the same axis as said deflecting means; and posture change detecting means for detecting posture change, said posture change detecting means applying a voltage to said coil based on an amount of the posture change;

wherein said deflecting means is disposed in front of said optical means so that there is no condensing means located on an optical path between said deflecting means and the partner communication apparatus.

7. The apparatus according to claim 6, wherein said deflecting means is a single reflection mirror.

* * * * *

UNITED STATES PATENT AND TRADEMARK OFFICE
CERTIFICATE OF CORRECTION

PATENT NO. : 5,867,294

DATED : February 2, 1999

INVENTOR(S) : MIKIO SAKAI

It is certified that error appears in the above-identified patent and that said Letters Patent is hereby corrected as shown below:

COLUMN 2,
Line 24, "age" should be deleted.

COLUMN 4,
Line 24, "correot" should read --correct--; and
Line 66, "elements," should read --element,--.

COLUMN 6,
Line 48, "a" should read --the--; and
Line 49, "does," should be deleted.

COLUMN 8,
Line 12, "axes; and" should read --axes;--.

Signed and Sealed this

Seventeenth Day of August, 1999

Q. TODD DICKINSON

Attest:

Attesting Officer

Acting Commissioner of Patents and Trademarks